UNITED STATES PATENT OFFICE.

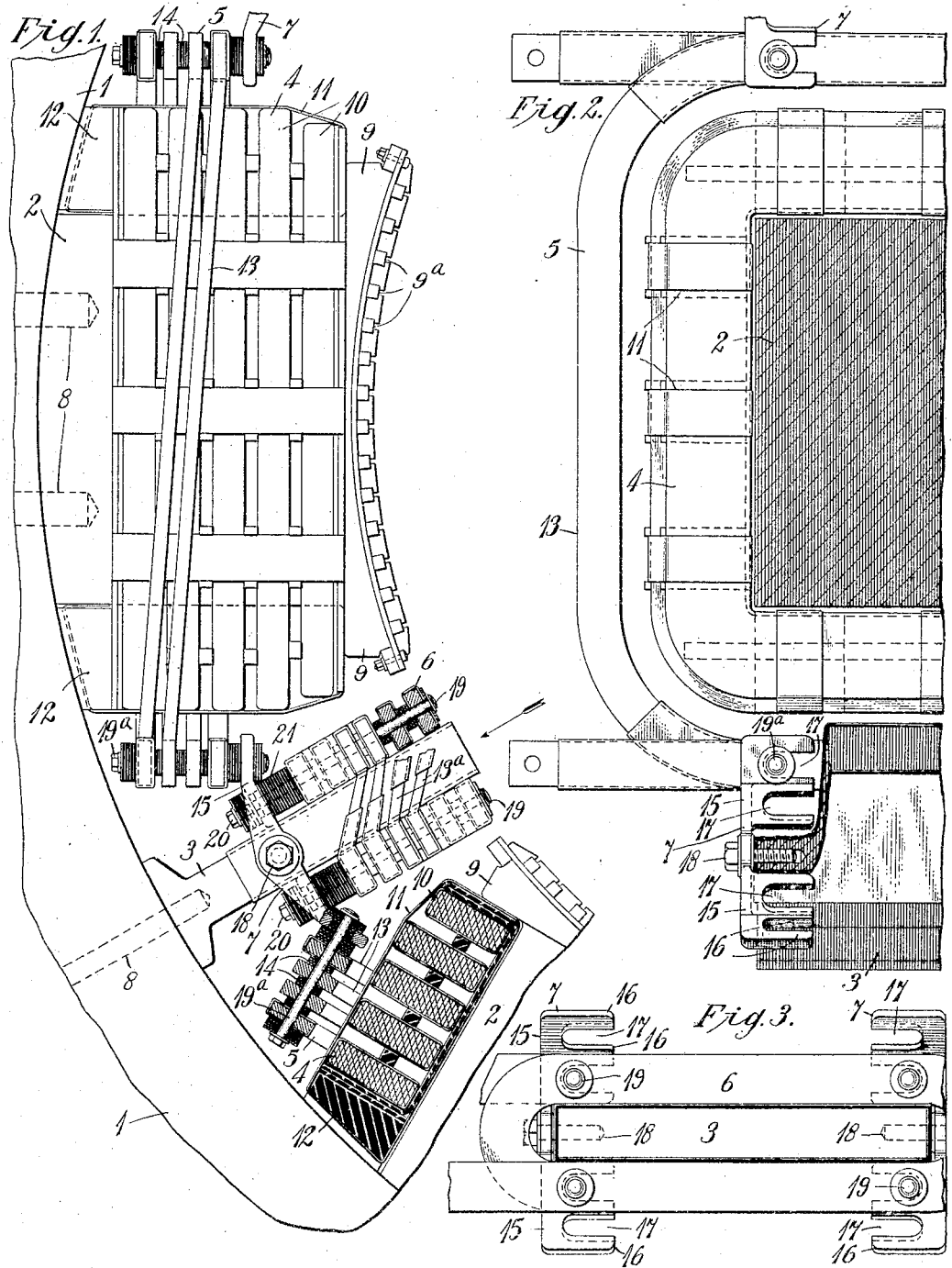

JOHN L. McK. YARDLEY, OF PITTSBURGH, PENNSYLVANIA, ASSIGNOR TO WESTINGHOUSE ELECTRIC AND MANUFACTURING COMPANY, A CORPORATION OF PENNSYLVANIA.

FIELD-COIL SUPPORT.

1,238,243.  Specification of Letters Patent.  Patented Aug. 28, 1917.

Application filed October 17, 1912. Serial No. 726,265.

*To all whom it may concern:*

Be it known that I, JOHN L. McK. YARDLEY, a citizen of the United States, and a resident of Pittsburgh, in the county of Allegheny and State of Pennsylvania, have invented a new and useful Improvement in Field-Coil Supports, of which the following is a specification.

My invention relates to dynamo-electric machines, and it has special reference to supporting structures for field coils of machines of the interpole type.

One object of my invention is to provide a well-ventilated field coil structure of the class above indicated, which shall be simple, inexpensive and durable in construction, and shall be so disposed as to provide for liberal radiation and thereby avoid excessive heating.

Another object of my invention is to provide simple means associated with the interpolar projections for supporting the interpole field coils and the series field coils rigidly in position.

Another object of my invention is to support the series field coils independently of the main shunt field coils in such manner that the shunt field coils and series field coils may be readily disassociated and separated, the one from the other.

A still further object of my invention is to provide supporting means for the series and commutating field coils which shall be cheap, light and compact and which may be employed to advantage by reason of the economy in space and material that may be secured by their use.

Heretofore, it has been customary in the art to provide dynamo-electric machines of the interpole type with commutating field coils upon the interpolar projections and shunt field coils and series coils upon the main polar projections.

In a co-pending application, Serial No. 598,519, filed December 21, 1910, by Fielder I. Hiss, Jr., and assigned to the Westinghouse Electric & Manufacturing Co., a machine of this general type is shown and described, in which the series and the shunt field coils are concentrically arranged and are securely taped or bound together to form a unitary structure.

It is well known that shunt field coils occasionally become defective by reason of overheating; while the series field coils and commutating field coils rarely give any such trouble. Therefore, in case of a defective shunt field coil in the structure set forth in the co-pending application referred to, it is necessary to unwind or sever the tape which holds the series and shunt coils together in order to facilitate repairs or renewals.

According to my present invention, I propose to support the series field coils and the interpolar or commutating field coils by means of supporting members or brackets which are associated with the interpolar projections in such manner that the shunt field coils shall be entirely independent and may be readily disassociated from the series coils, while the commutating field coils may be easily removed without interfering with the remainder of the structure.

Furthermore, by supporting the series and commutating coils upon brackets that are secured to the interpolar projections, in lieu of similar means that are associated with the main polar projections, considerably shorter main polar projections may be employed, which permits of material reductions in the size and weight of the field magnet frame.

My invention may best be understood by reference to the accompanying drawing, in which Figure 1 is a view, partially in side elevation and partially in section, of a portion of a dynamo-electric machine embodying my invention. Fig. 2 is a face view, partially in section, of a portion of the device shown in Fig. 1, certain parts being removed for the sake of clearness, and Fig. 3 is a face view of the interpole shown in Figs. 1 and 2, looking in the direction of the arrow.

Referring to the drawing, the apparatus here shown comprises a main field magnet frame 1, having main polar projections 2, interpolar projections 3, shunt field coils 4 and series field coils 5 associated with the main polar projections 2, interpolar or commutating field coils 6 associated with the interpolar projections 3, and a plurality of members or brackets 7 for supporting the series field coils 5 and the commutating field coils 6 in position.

The main polar projections 2 and the interpolar projections 3 are severally of like construction and each may comprise a solid or a laminated structure, as desired, which is detachably secured to the field magnet frame 1 by bolts 8 or other suitable means. The polar projections 2 are provided with outwardly extending pole tips 9 and with closed circuit windings or dampers 9ª of well known construction, although the damper windings 9ª may be omitted since they form no material part of my present invention.

The shunt field coil 4 comprises a plurality of flat coils 10 that are assembled side-by-side and suitably spaced and insulated the one from the other. The coils 10 are secured together to form a rigid unitary structure by narrow strips of insulating tape 11 which are disposed at intervals around the coils. Each of the individual flat coils 10 comprises a plurality of turns of conductor which are bound together in the usual manner. By reason of the structure just described, a coil having particularly good radiation and ventilation is obtained, although I do not wish to be restricted to this form of coil, as any other suitable type may be employed.

The coil 4 is disposed upon the main polar projection 2 and rests against the pole tips 9 at one end, while the other end thereof is provided with a plurality of spacing blocks 12 which are secured to the coil 4 and rest against the inside of the field magnet frame 1.

Each of the series coils 5 preferably comprises a plurality of convolutions 13 of heavy strap conductor which may or may not be covered with insulating material, said convolutions 13 being liberally spaced from each other by means of insulating washers 14, or other similar devices. The series coil 5 is considerably larger than the shunt coil 4 in order that it may be disposed around the same and liberally spaced therefrom to insure good ventilation and radiation.

The commutating or interpolar field coils 6 are of like construction and each comprises a plurality of convolutions 13ª of strap conductor which is wound and assembled in substantially the manner described with respect to the series coil 5.

The commutating field coil 6 is disposed upon the interpolar projection 3 and is rigidly supported in position by means of a plurality of members or brackets 7 which are bolted or otherwise rigidly attached to the opposite sides of the interpolar projection 3.

Each of the supporting members or brackets 7 is preferably punched from sheet material and comprises oppositely projecting arms 15 which are severally provided with a plurality of inwardly projecting fingers 16 so disposed as to provide a plurality of open-end slots 17. The supporting member 7 is provided with a hole at substantially its mid point to receive a bolt 18 by means of which said member is secured to the polar projection 3.

The commutating field coil 6 is attached to the supporting members 7 through the agency of a plurality of insulated bolts 19 which severally project through suitable openings in the several convolutions 13ª of the coil. The corresponding ends of each of the bolts 19 are disposed within the inner slots 17, and the bolts and associated coil 6 are rigidly attached to the supporting member 7 by means of nuts 20 and a plurality of insulating washers or like members 21 which are disposed on both sides of the projecting fingers 16.

Each of the series coils 5 is rigidly attached to the supporting members 7 by bolts 19ª which are disposed within the outer slots 17 in a similar manner to that hereinbefore described. It will be observed that the commutating field coil 6 and the series field coil 5 are disposed on opposite sides of the supporting arms 7, the series coil 5 being located adjacent to the field magnet frame 1, and the commutating field coil 6 being disposed on the inner end of the interpolar projection 3.

I do not wish to be restricted to the specific structural details hereinbefore set forth, as many changes may be effected without departing from the spirit and scope of my invention, and I desire that only such limitations shall be imposed as are indicated in the appended claims.

I claim as my invention:

1. In a dynamo-electric machine, the combination with a field-magnet frame having a plurality of radial polar projections and a plurality of field coils severally disposed thereon, of means carried by a portion of said projections to which field coils upon all of said projections are secured.

2. In a dynamo-electric machine, the combination with a field-magnet frame having a plurality of radial polar projections and a plurality of field coils severally disposed thereon, of means carried by alternate polar projections to which field coils upon all of said projections are independently secured.

3. In a dynamo-electric machine, the combination with a field-magnet frame having polar projections and interpolar projections and a plurality of field coils severally disposed thereon, of means carried by said interpolar projections to which field coils upon all of said projections are secured.

4. In a dynamo-electric machine, the combination with a field magnet frame having main polar projections and interpolar projections, and a plurality of field coils severally disposed upon said projections, of a plurality of supporting members or brackets secured to the opposite sides of said interpolar projections, and means for attaching said field coils to said supporting members or brackets.

5. In a dynamo-electric machine, the combination with a field magnet frame having a plurality of radial polar projections, shunt field coils disposed upon alternate polar projections, series field coils disposed upon the same polar projections and concentrically disposed with respect to the shunt field coils, and commutating field coils disposed upon the intermediate polar projections, of means associated with said intermediate polar projections for supporting said commutating field coils and said series field coils rigidly in position.

6. In a dynamo-electric machine, the combination with a field magnet frame having a plurality of radial polar projections, shunt field coils disposed upon alternate polar projections, series field coils disposed upon the same polar projections and concentrically disposed with respect to the shunt field coils, and commutating field coils disposed upon the intermediate polar projections, of supporting members or brackets attached to the intermediate polar projections, and means for securing said series coils and said commutating coils thereto.

7. In a dynamo-electric machine, the combination with a field magnet frame having main polar projections and interpolar projections, shunt field coils and series field coils concentrically associated with the main polar projections, the series coils being located adjacent to the field magnet frame, and commutating field coils disposed upon the interpolar projections and located near the inner ends thereof, of supporting members or brackets rigidly secured to the interpolar projections, intermediate their ends, and means for attaching said series coils and said commutating coils to the opposite sides of said supporting brackets.

In testimony whereof, I have hereunto subscribed my name this 15th day of Oct., 1912.

JOHN L. McK. YARDLEY.

Witnesses:
B. B. HINES,
A. M. LUNDY.

Copies of this patent may be obtained for five cents each, by addressing the "Commissioner of Patents Washington, D. C."